United States Patent Office
3,357,935
Patented Dec. 12, 1967

3,357,935
POLYAMIDE COMPOSITIONS BASED ON DIAMINES DERIVED FROM DIPHENYL OXIDE
Richard W. Fulmer, Minneapolis, and Edgar R. Rogier, Minnetonka, Minn., assignors to General Mills, Inc., a corporation of Delaware
No Drawing. Filed June 1, 1965, Ser. No. 460,524
7 Claims. (Cl. 260—18)

ABSTRACT OF THE DISCLOSURE

Polyamide resins derived from polymeric fat acids prepared from fat acids containing 8 to 24 carbon atoms, and p,p'-bis(β-aminoethyl) diphenyl oxide, which are either homopolymers or copolymers with other dibasic acids, amino acids or lactams.

The present invention relates to certain polyamide resins derived from a particular polyamine namely p,p'-bis-(β-aminoethyl) diphenyl oxide. More particularly the invention relates to polyamide resins derived from polymeric fat acids and the above diamine. The polyamide resins of the present invention are characterized by novel properties and a preferred group of them are characterized by high tensile modulus of elasticity, good tensile strength and very low moisture absorption.

It is therefore an object of the present invention to provide novel polyamide resin compositions derived from polymeric fat acids and p,p'-bis-(β-aminoethyl) diphenyl oxide.

The polyamides of the present invention are derived at least in part from polymeric fat acids and may be derived either entirely from such acids or of mixtures of such acids with other polybasic acids. In place of the acid it is possible to employ other polyamide forming derivatives of the acid such as the ester, amide, etc.

Co-reacting dibasic acids or esters employed in the preparation of the copolyamides of the present invention are selected from compounds having the formulae

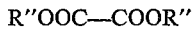

and

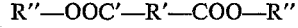

where R' is an aliphatic hydrocarbon radical having from 1 to 20 carbon atoms, an alicyclic or aliphatic substituted alicyclic hydrocarbon radical having from 6 to 20 carbon atoms, an aromatic or an aliphatic substituted aromatic radical having from 6 to 20 carbon atoms and R'' is hydrogen or an alkyl group having from 1 to 8 carbon atoms. In general, R' is a divalent alkylene radical having from 2 to 12 carbon atoms. Such acids are illustrated by oxalic, malonic, adipic, pimelic, suberic, azelaic, sebacic, dodecanedioic, succinic, glutaric acids and the like. R' may also be branched, such as in dimethyl malonic acid, dimethyl succinic acid, and the heptadecanedioic acids. Illustrative of the aromatic acids are terephthalic, isophthalic, naphthalene dicarboxylic acids, and the like. Illustrative of alicyclic dicarboxylic acids are 1,4- and 1,3-cyclohexane dicarboxylic acid. R'' is generally an alkyl group such as methyl, ethyl, propyl, butyl or octyl. It is understood that other amide forming derivatives of said carboxylic acids may also be used, such as amides, nitriles, and acid chlorides.

As previously pointed out, in place of the dibasic acids or esters set forth above, amino acids or their corresponding lactams may be employed. Such amino acids may be represented by the formula

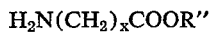

where $x$ is an integer from 2 to 15, and R'' is as defined above. The corresponding lactams may be represented by the formula

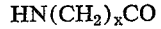

where $x$ is as defined above. In general, the most common amino acids or the corresponding lactams employed are aminocaproic acid (or epsilon-caprolactam), aminoundecanoic acid and omega-capryllactam, where $x$ is 5, 10, and 7, respectively.

The term "polymeric fat acids" as used herein is intended to be generic to polymerized acids obtained from "fat acids." The term "fat acids" is intended to include saturated, ethylenically unsaturated and acetylenically unsaturated naturally occurring and synthetic monobasic aliphatic acids containing from 8–24 carbon atoms.

The saturated, ethylenically unsaturated and acetylenically unsaturated fat acids are generally polymerized by somewhat different techniques, but because of the functional similarity of the polymerization products, they all are generally referred to as "polymeric fat acids."

Saturated fat acids are difficult to polymerize but polymerization can be obtained at elevated temperatures with a peroxidic catalyst such as di-t-butyl peroxide. Because of the generally low yields of polymeric products, these materials are not currently commercially significant. Suitable saturated fat acids include branched and straight acids such as caprylic acid, pelargonic acid, capric acid, lauric acid, myristic acid, palmitic acid, isopalmitic acid, stearic acid, arachidic acid, behenic acid and lignoceric acid.

The ethylenically unsaturated acids are much more readily polymerized. Catalytic or non-catalytic polymerization techniques can be employed. The non-catalytic polymerization generally requires a higher temperature. Suitable catalysts for the polymerization include acid or alkaline clays, di-t-butyl peroxide, boron trifluoride and other Lewis acids, anthraquinone, sulfur dioxide and the like. Suitable monomers include the branched straight chain, poly and mono ethylenically unsaturated acids such as 3-octenoic acid, 11-dodecenoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timnodonic acid, eicosatetraenoic acid, nisinic acid, scoliodonic acid and chaulmoogric acid.

The acetylenically unsaturated fat acids can be polymerized by simply heating the acids. Polymerization of these highly reactive materials will occur in the absence of a catalyst. The acetylenically unsaturated acids occur only rarely in nature and are expensive to synthesize. Therefore, they are not currently of commercial significance. Any acetylenically unsaturated fat acid, both straight chain and branched chain, both mono-unsaturated and poly-unsaturated, are useful monomers for the preparation of the polymeric fat acids. Suitable examples of such materials include 10-undecynoic acid, tariric acid, stearolic acid, behenolic acid and isamic acid.

Because of their ready availability and relative ease of polymerization, oleic and linoleic acids are the preferred starting materials for the preparation of the polymeric fat acids.

It is understood that the term "polymeric fat acids" includes the acids and such other derivatives capable of forming amides in a reaction with a diamine such as the lower alcohol esters of polymeric fat acids.

Having obtained the polymeric fat acids or derivatives as described above, they may then be fractionated, for example, by conventional techniques of distillation or solvent extraction. They may be hydrogenated (before or after distillation) to reduce unsaturation under hydrogen pressure in the presence of a hydrogenation catalyst.

Typical compositions of commercially available polymeric fat acids, based on unsaturated $C_{18}$ fat acids, are:

| | Percent by wt. |
|---|---|
| $C_{18}$ monobasic acids ("monomer") | 5–15 |
| $C_{36}$ dibasic acids ("dimer") | 60–80 |
| $C_{54}$ (and higher) ("trimer") polybasic acids | 10–35 |

The relative ratios of monomer, dimer and trimer (or higher) in unfractionated polymeric fat acids are dependent on the nature of the starting material and the conditions of polymerization. For the purpose of this invention, the term monomeric fat acids refers to the polymerized monomeric acids or derivatives present in the polymeric fat acids; the term dimeric fat acids refers to the dimeric acids or derivatives (formed by the dimerization of two fat acid molecules); and the term trimeric fat acids refers to the residual higher polymeric forms consisting primarily of trimeric acids or derivatives, but containing some higher polymeric forms.

For the purposes of this invention, the terms monomeric, dimeric and trimeric fat acids, are defined further by a micromolecular distillation analytical method. The method is that of Paschke, R. F., et al., J. Am. Oil Chem. Soc. XXXI (No. 1), 5 (1954), wherein the distillation is carried out under high vacuum (below 5 microns) and the monomeric fraction is calculated from the weight of product distilling at 155° C., the dimeric fraction is calculated from that distilling between 155° C. and 250° C., and the trimeric (or higher) fraction is calculated based on the residue.

Any of the dimeric or polymeric fat acids referred to herein may be reacted with the above-mentioned amine to produce polyamide resins of a variety of different properties. Thus, the polymeric fat acids may contain substantial amounts of monomer and trimer. The polymeric fat acids may be used either in approximately equivalent ratios to the diamine or in larger or smaller equivalent ratios. If the ratios are approximately equivalent, a higher polymer is obtained whereas, if an excess of either the polymeric fat acid or the diamine is employed, the chain length is reduced and the polymer generally has terminal groups of the reagent employed in excess. The preferred polyamides however, are those obtained by reacting substantially equivalent quantities of the diamine with a polymeric fat acid, either by itself or in combination with any of the other dibasic acids mentioned herein but wherein the polymeric fat acid has a minimum of 95 percent by weight of dimeric fat acid based on the total polymeric fat acid employed. Under these circumstances a relatively high molecular weight polyamide may be produced which has desirable and unusual properties. While the resins of much lower molecular weight may be produced where the polymeric fat acid contains a minimum of 65 percent of dimeric fat acid, it is preferred to maintain the percent of dimeric fat acid in excess of 95 percent of the polymeric fat acids employed.

In addition to controlling the dimeric species (difunctional) content of the polymeric fat acids of the present invention, at the lower dimeric fat acid contents some control may be necessary as to the monomeric species (monofunctional) and trimeric (trifunctional) species content to achieve optimum results in the production of high molecular weight resins. Polyamides prepared with polymeric fat acids having too high a trimeric content tend to be nearly intractable, exhibiting the extremely high melt viscosities and/or insoluble gels typical of a cross-linked polymer. The presence of sufficient monofunctional material will prevent gellation. But polyamides prepared with polymeric fat acids having too high a monomeric species content tend to provide lower elongation and lower tensile strength, as is typical of a low molecular weight polymer resulting from the reaction of a monofunctional "chain-stopping" component. Hence, controlled monomeric/trimeric contents are necessary to obtain optimum products at the lower dimeric fat acid contents. These effects, of course, are particularly noticeable in copolyamides where the proportion of polymeric fat acids employed is relatively high.

The diamine employed in the present invention namely p,p'-bis($\beta$-aminoethyl) diphenyl oxide may be prepared from the commercially available p,p'-bis(chloromethyl)-diphenyl oxide by reacting the same with sodium cyanide to convert the chloro groups to nitrile groups and then reducing the nitrile to the amine under known conditions.

The process of producing the polyamides may be carried out under conditions normal for this type of operation. Suitable reaction conditions include temperature of 150–300° C. at approximately atmospheric pressure for a period of about 1–5 hours during which time the by-product of the reaction (water if the acid is used or alcohol if the ester was used) is permitted to distill off. Following the reaction the reaction mixture may be maintained under a vacuum (ca. 20 mm. Hg) to remove the remaining volatile by-product at a temperature of 150–300° C. for an additional period of a half to 3 hours.

The preparation of the diamines from the commercially available dichloromethyl diphenyl oxide is as follows:

Into a reactor equipped with a heating and cooling coil, stirrer, resin flask top, condenser and a steam heated (jacketed) dropping funnel were placed NaCN and dimethyl formamide. A solution of the dichloro compound in dimethyl formamide was slowly added while maintaining the reaction temperature at about 50° C. The mixture was stirred an additional hour. The cooled reaction mixture was filtered to remove salts and was then stripped of most of the solvent on a rotary evaporator. The residue was taken up in benzene and washed several times with distilled water. Removal of the solvent yielded a crude product which was distilled using a flask equipped with a Claisen head. (Boiling point was 200–216° C. at 0.22 mm.)

Gas liquid chromatographic analysis showed one peak.

Preparation of the diamine from the above dinitrile was accomplished by hydrogenating over a cobalt catalyst. The procedure was as follows:

Into a Magne Dash autoclave were placed 250 g. (1 mole) of dinitrile, 250 ml. of absolute ethanol, 30 g. of cobalt on kieselguhr catalyst and 70 ml. of ammonia. The autoclave was pressurized with hydrogen and heated to 123–129° C. The hydrogenation required 2 hours at 1600 p.s.i. The autoclave was cooled and vented, and the catalyst was removed by filtration. The solvent was removed on a rotary evaporator. A yield of 259 g. of a light amber product was obtained. IR analysis showed no nitrile. The product had a total amine number of 429 (theo. 438) and a secondary and tertiary amine No. of 1.6 (theo. 0). Distillation of 239 g. of this product yielded 96.4% as a clear, colorless diamine (boiling point 176–178° C. at 0.12 to 0.28 mm. of pressure) which had a total amine number of 438 and secondary and tertiary amine number of 1.9.

The above purified p,p'-bis ($\beta$-aminoethyl) diphenyl oxide was used for the preparation of the polymers of this invention. Following are the specific experimental details for the preparation of the polyamides.

The mechanical properties of direct interest in the compositions of the present invention are tensile ultimate and elongation. These properties are measured on an Instron Tensile Tester Model TTC using ASTM D1708–59T.

The polymer is compression molded as a 6" x 6" sheet of approximately 0.04 inch thickness, at a temperature near its melting point (usually a few degrees lower than the melting point) and at 40,000 lbs. load or higher using cellophane as the parting agent in the mold. From this sheet, test specimens are die-cut to conform to ASTM D1708–59T.

The test specimen is clamped in the jaws of the Instron. Crosshead speed is usually 0.5 inch/minute at 100 pound full scale load. Chart speed is 0.5 inch/minute. Tensile ultimate (reference: ASTM D638–52T) is calculated as:

$$\text{Tensile ultimate} = \frac{\text{load in pounds at break}}{\text{cross sectional area (sq. in.)}}$$

Percent elongation is calculated as:

Percent elongation =
$$\frac{\text{gage length at break} - \text{gage length at 0 load}}{\text{gage length at 0 load}} \times 100$$

In addition to tensile ultimate and elongation, the following properties were measured on most of the polymers prepared:

(1) Ball and ring softening point—ASTM E28–59T.
(2) Amine and acid end groups—conventional analytical titration procedures. The results are expressed in terms of milliequivalents of acid or amine per kilogram of product (meq./kg.).
(3) Inherent viscosity—defined by equation:

$$\text{inh} = \frac{\ln \eta_{rel}}{C}$$

where $C$ = concentration of polymer in grams per 100 ml. of solution, $\ln \eta_{rel}$ = natural logarithm of the relative viscosity of the dilute polymer solution. In the examples below, all viscosities are measured on m-cresol at 30° C., usually at a concentration of 1.0 g./100 ml.

(4) Tensile modulus—as defined in ASTM D638–60T.
(5) Toughness—this is taken as the area under the stress-strain curve, cf. Carswell & Nason, Symposium on Plastics, ASTM, Philadelphia, February 1944, p. 23.
(6) Water absorption—as defined in ASTM D570–59aT.

*Example I*

Into a reactor (glass) equipped with a stirrer, thermocouple and distillation head were placed 226.4 grams (0.8 equivalent) of distilled, hydrogenated polymeric fat acids prepared from tall oil fat acids having the following analysis:

| | | |
|---|---|---|
| Monomer (M) | percent | 0.7 |
| Dimer (D) | do | 99.1 |
| Trimer (T) | do | 0.2 |
| Sap. equivalent | | 285 |
| Neutral equivalent | | 290 | and 102.5 grams (0.8 equivalent) p,p'-bis(β-aminoethyl) diphenyl oxide (BAEDPO).

The mixture was heated 1.75 hours at 30–160° C., 1.25 hours at 160–250° C., 1.0 hour under water pump vacuum (ca. 6 mm. Hg) and 3.0 hours under vacuum (ca. <1 mm. Hg) at 275° C. The resulting polyamide had the following properties:

| | |
|---|---|
| Amine (meq./kg.) | 20 |
| Acid (meq./kg.) | 24 |
| Inh. vis. (1 g./100 ml. in m-cresol, 130° C.) | 0.55 |
| Ball and ring softening point, ° C. | 158 |
| Elongation, percent | 310 |
| Tensile ultimate (p.s.i.) | 4,470 |
| Tensile modulus (p.s.i.) | 50,000 |
| Yield strength (p.s.i.) | 2,470 |
| Water absorption, percent 24 hr. Im. | 0.16 |

*Example II*

Into a reactor (stainless steel) were placed 215.9 grams (0.763 equivalent) of distilled hydrogenated polymeric fat acids described in Example I, 48.4 grams (0.473 equivalent) of sebacic acid and 158.3 grams (1.236 equivalents) of BAEDPO.

The mixture was heated two hours at 30 to 250° C., 1.25 hours at 250° C. and three hours under vacuum (ca. <1 mm. Hg) at 275° C. The resulting polyamide had the following properties:

| | |
|---|---|
| Amine (meq./kg.) | 31 |
| Acid (meq./kg.) | 27 |
| Inh. vis. (1 g./100 ml. in m-cresol, 130° C.) | 0.63 |
| Ball and ring softening point, ° C. | >200 |
| Elongation, percent | 150 |
| Tensile ultimate (p.s.i.) | 4,900 |
| Tensile modulus (p.s.i.) | 128,000 |
| Yield strength (p.s.i.) | 5,050 |
| Water absorption, percent 24 hr. Im. | 0.11 |

*Example III*

Into a reactor (stainless steel) were placed 215.9 grams (0.763 equivalent) of distilled hydrogenated polymeric fat acids described in Example I, 44.0 grams (0.507 equivalent) of suberic acid and 162.7 grams (1.27 equivalents) of BAEDPO.

The mixture was heated 3.75 hours from 30–275° C. and 3 hours under vacuum (ca. <1 mm. Hg) at 275° C. The resulting polyamide had the following properties:

| | |
|---|---|
| Amine (meq./kg.) | 24 |
| Acid (meq./kg.) | 26 |
| Inh. vis. (1 g./100 ml. in m-cresol, 130° C.) | 0.81 |
| Ball and ring softening point, ° C. | >200 |
| Elongation, percent | 340 |
| Tensile ultimate (p.s.i.) | 5,060 |
| Tensile modulus (p.s.i.) | 142,000 |
| Yield strength (p.s.i.) | 5,110 |

*Example IV*

Into a reactor (stainless steel) were placed 215.9 grams (0.763 equivalent) of the distilled hydrogenated polymeric fat acids described in Example I, 51.17 grams (0.443 equivalent) of 1,12 dodecanedioic acid and 154.5 grams (1.206 equivalents) of BAEDPO.

The mixture was heated 3.5 hours at 30–250° C. and 2.75 hours under vacuum (ca. <1 mm. Hg) at 275° C. The resulting polyamide had the following properties.

| | |
|---|---|
| Amine (meq./kg.) | 20 |
| Acid (meq./kg.) | 28 |
| Inh. vis. (1 g./100 ml. in m-cresol, 130° C.) | 0.62 |
| Ball and ring softening point, ° C. | 192 |
| Elongation, percent | 290 |
| Tensile ultimate (p.s.i.) | 4,800 |
| Tensile modulus (p.s.i.) | 72,000 |
| Yield strength (p.s.i.) | 3,220 |

*Example V*

Into a reactor (stainless steel) were placed 215.9 grams (0.763 equivalent) of distilled hydrogenated polymeric fat acids of Example I, 40.79 grams (0.546 equivalent) of adipic acid and 167.7 grams (1.309 equivalents) of BAEDPO.

The mixture was heated 3.75 hours at 30–275° C. and 2.25 hours under vacuum (ca. <1 mm. Hg) at 275° C. The resulting polyamide had the following properties:

| | |
|---|---|
| Amine (meq./kg.) | 18 |
| Acid (meq./kg.) | 37 |
| Inh. vis. (1 g./100 ml. in m-cresol, 130° C.) | 0.56 |
| Ball and ring softening point, ° C. | >210 |
| Elongation, percent | 145 |
| Tensile ultimate (p.s.i.) | 4,520 |
| Tensile modulus (p.s.i.) | 94,000 |
| Yield strength (p.s.i.) | 4,560 |
| Water absorption, percent 24 hr. Im. | 0.17 |

In the preparation of copolymers it is preferred to employ the additional dicarboxylic acid or amino acid in a weight ratio not exceeding approximately 50 weight percent of the total acid employed. Preferably, this weight ratio will be in the general range of 10% to 35% regardless of whether high or low molecular weight resins are produced.

The embodiments of the invention in which an exclusive property or privilege is claimed are defined as follows:

1. A polyamide resin comprising the reaction product of polymeric fat acids prepared from fat acids containing 8 to 24 carbon atoms and p,p'-bis(β-aminoethyl) diphenyl oxide.

2. A polyamide resin comprising the condensation reaction product of polymeric fat acids prepared from fat acids containing 8 to 24 carbon atoms having a dimeric fat acid content greater than 95% by weight and p,p'-bis(β-aminoethyl) diphenyl oxide.

3. A polyamide composition comprising the reaction product of p,p'-bis(β-aminoethyl) diphenyl oxide and a mixture of (A) polymeric fat acids prepared from fat acids containing 8 to 24 carbon atoms and (B) a compound selected from the group consisting of (a) R''OOC—COOR''
(b) R''—OOC—R'—COO—R''
(c) $H_2N(CH_2)_xCOOR$
(d) $HN(CH_2)_xCO$ (cyclic)

where R' is selected from the group consisting of aliphatic hydrocarbon radicals having from 1 to 20 carbon atoms, alicyclic and aliphatic substituted alicyclic hydrocarbon radicals having from 6 to 20 carbon atoms and aromatic and aliphatic substituted aromatic hydrocarbon radicals having from 6 to 20 carbon atoms, R'' is selected from the group consisting of hydrogen and alkyl groups having from 1 to 8 carbon atoms and $x$ is an integer from 2 to 15.

4. A copolyamide resin comprising the reaction product of a mixture of polymeric fat acids prepared from fat acids containing 8 to 24 carbon atoms and an aliphatic dicarboxylic acid containing from 1 to 20 carbon atoms in the aliphatic group separating the carboxyl groups with p,p'-bis(β-aminoethyl) diphenyl oxide.

5. A copolyamide according to claim 3 in which the dimeric fat acid content of the polymeric fat acids is in excess of 65 weight percent.

6. A copolyamide according to claim 3 in which the Compound B constitutes not more than 50 weight percent of the total acid.

7. A copolyamide according to claim 3 in which the Compound B constitutes from 15 to 35 weight percent of the total acid.

References Cited

UNITED STATES PATENTS 2,191,556   2/1940   Carothers _____ 260—78

DONALD E. CZAJA, *Primary Examiner.*

C. W. IVY, *Assistant Examiner.*

UNITED STATES PATENT OFFICE
CERTIFICATE OF CORRECTION

Patent No. 3,357,935                                  December 12, 1967

Richard W. Fulmer et al.

It is certified that error appears in the above identified patent and that said Letters Patent are hereby corrected as shown below:

Column 1, line 31, "p,p′-bis-" should read -- p,p′-bis --; line 44, "R″-OOC′-R′-COO-R″" should read -- R″-OOC-R′-COO-R″ --. Column 3, lines 12 and 13, "polymerized" should read -- unpolymerized --. Column 4, line 39, "Preperation" should read -- Preparation --.

Signed and sealed this 30th day of December 1969.

(SEAL)
Attest:

Edward M. Fletcher, Jr.                              WILLIAM E. SCHUYLER, JR.
Attesting Officer                                               Commissioner of Patents